April 29, 1969 L. A. HUGHES 3,441,352
COLORIMETER USING INTERCHANGEABLE METERS
Filed Jan. 25, 1965 Sheet 1 of 3
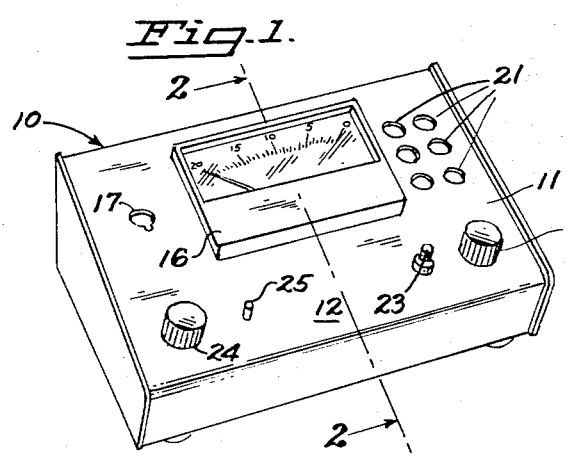
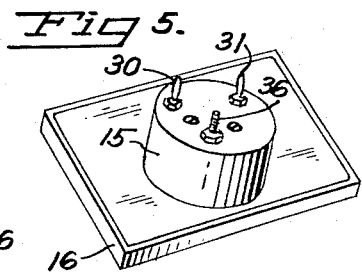
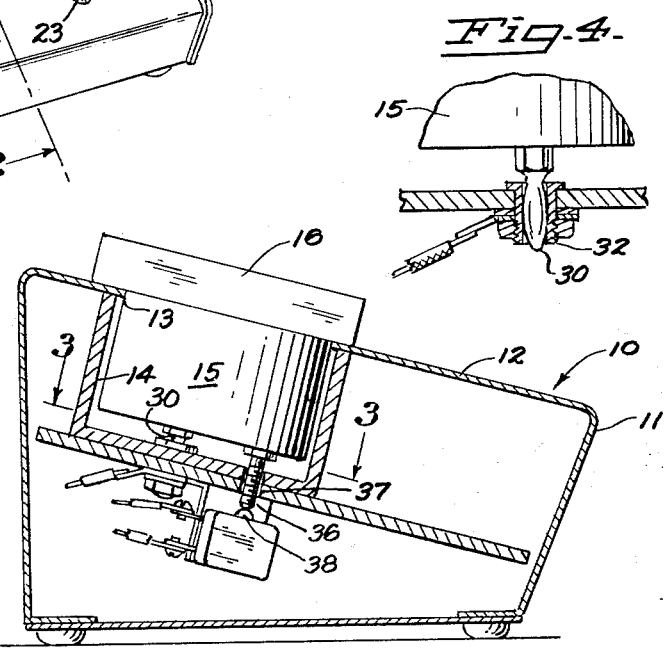
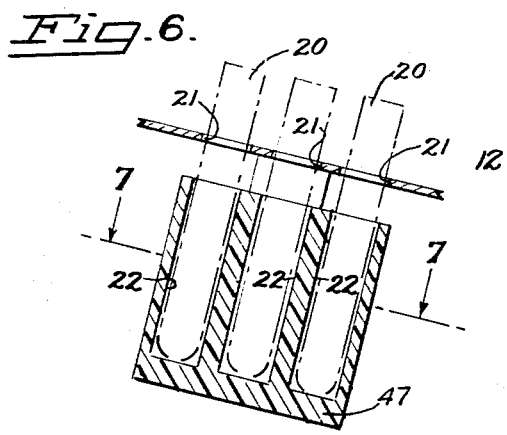
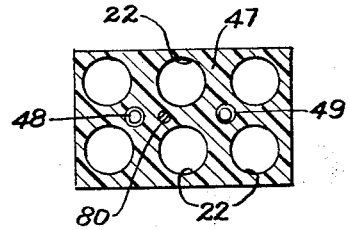
INVENTOR
LEONARD A. HUGHES
BY
Owen, Wickersham & Erickson
ATTORNEYS

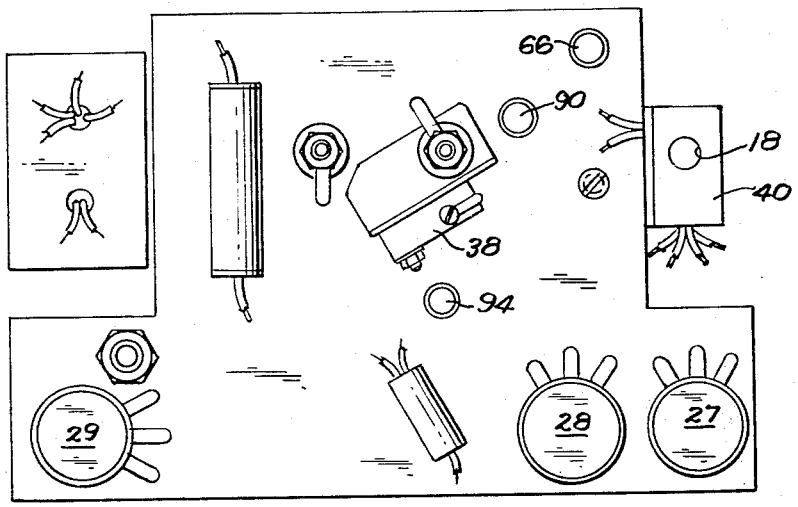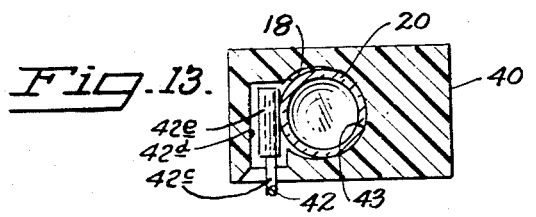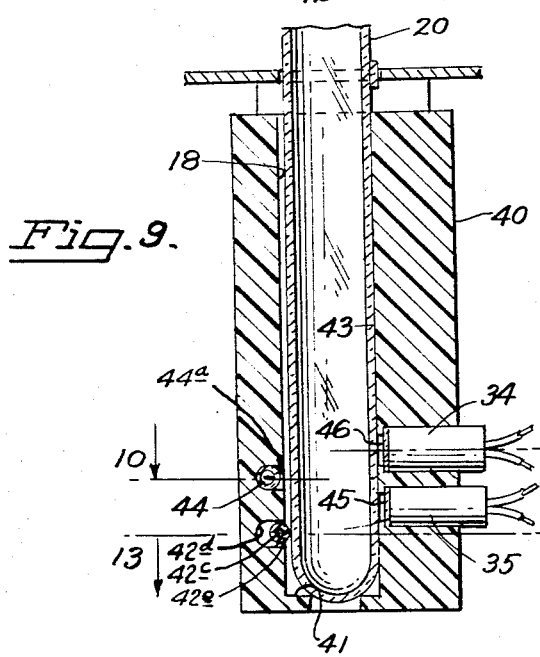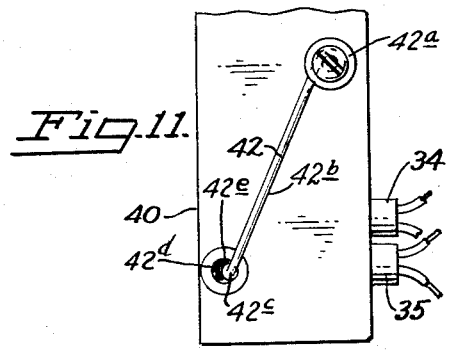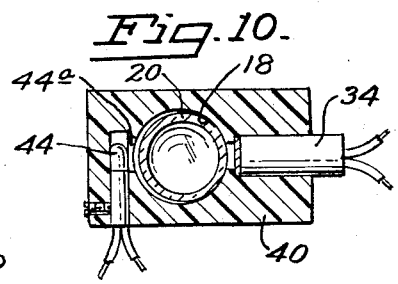

United States Patent Office 3,441,352
Patented Apr. 29, 1969

3,441,352
COLORIMETER USING INTERCHANGEABLE METERS
Leonard A. Hughes, Oakland, Calif., assignor, by mesne assignments, to Nuclear-Chicago Corporation, Des Plaines, Ill., a corporation of Delaware
Filed Jan. 25, 1965, Ser. No. 427,808
Int. Cl. G01n *21/00;* G01j *3/00;* G01r *1/38*
U.S. Cl. 356—189                                    7 Claims

ABSTRACT OF THE DISCLOSURE

A colorimeter. A receptacle receives a colorimeter cuvette containing a specimen, a spring in the cuvette urging it against one side thereof. At one side of the receptacle is an electric lamp as a light source and on the diametrically opposite side, against which the cuvette is urged, are a plurality of vertically displaced photoelectric cells. Each cell has maximum sensitivity to a different monochromatic light and has associated with it a filter for transmitting to the cell that monochromatic light to which its said cell has maximum sensitivity. An electric circuit includes the lamp, switch means for placing each cell in the circuit, only one at any time, a bridge circuit responsive to the current of the cell then in the circuit, and an electrical heater, which operates an incubator having a plurality of cuvette receptacles. A plurality of interchangeable meters, each relevant to one particular test and calibrated for direct reading in that test in conjunction with one cell and each insertable into and removable from the electric circuit is supplied, but only one is used at a time across the bridge circuit for measuring light transmissivity of said specimen as expressed by the current passing through the said photoelectric cell then in the electric circuit. Some of these meters have an actuator and some do not, the actuator, when present, throwing the switch means to place a different cell in the electric circuit.

---

This invention relates to an improved compact colorimeter primarily intended for use by individual physicians and others having limited laboratory space.

One object of the invention is to provide an instrument that enables physicians to perform some of the tests which they rely upon for information about their patients but which heretofore have generally required too expensive a laboratory installation or equipment that is too large, so that they were kept from obtaining their results as rapidly and inexpensively as when the work is done by themselves. By doing the work themselves, they also know what was done, instead of having to accept at second hand the work done by an outside laboratory.

The colorimeter of this invention enables quantitative and biological analysis of various body fluids and other liquids by measuring the transmissivity of the various liquids to any of a plurality of monochromatic lights. For example, in measuring the hemoglobin content of blood, a test tube containing a prepared blood sample diluted with a selected reagent is placed in the colorimeter, and the transmissivity of the sample to green light is photo-electrically measured, since hemoglobin is relatively opaque to green light. The blood sugar test can also be done with the same green light. However, the cholesterol test requires a red light for the best results. Various other tests require some particular color of light in order to obtain the best results, and the particular color is different for different tests.

Heretofore, colorimeters have been equipped with filters or wedges that could be changed to select from the white light of a lamp bulb, a monochromatic band of light. However, there was a problem in that photoelectric cells respond differently to the different colors of light, and each cell has a peak response to some particular wave length of light, with the response dropping off rather sharply on each side of the peak. For example, a photoelectric cell that gives optimum response to green light is ill suited for use with red light. Consequently, merely changing the filters over the light and adjusting the current through the galvanometer did not entirely solve this problem.

The present invention solves the problem by providing a plurality of photoelectric cells, each having associated with it a light filter which removes all except the particular monochromatic band of light to which the photoelectric cell is primarily responsive and where its peak response is located. Thus, a different cell is used for each color of light. For example, with the hemoglobin and blood sugar tests referred to earlier, the photoelectric cell is primarily responsive to green light and has a green filter associated with it. Similarly, for the cholesterol test the photoelectric cell is primarily responsive to red light and has a red filter associated with it.

Other objects of the invention are to make the change-over from one color to another foolproof and to avoid the necessity for the physician performing calculations. To this end, the present invention is characterized by its use of a single main instrument and a plurality of plug-in meters, one for each type of test. Thus, the invention uses separate meters for the hemoglobin concentration test, the glucose concentartion test, and the cholesterol test. Each meter is calibrated to read directly the useful values for its test. For hemoglobin values, the meter can read in gram percent directly on the instrument, with the scale of the meter spread over the possible useful percents; for glucose the meter preferably will read in milligrams percent directly on a scale corresponding to amounts typically or at least actually found in such tests; for cholesterol the meter reads directly in milligrams percent of cholesterol with the full scale range again over a practical spread.

The meters are removable from and insertable into the rest of the instrument, which includes all the remainder of the circuit. Only one meter is used at a time, so that there is no problem for the doctor to know which meter he is reading and which test he is reading on. The meter has its identity printed directly upon it and it is put in at the beginning of a series of tests and left for that series; then for different tests, that meter is taken out and replaced with the appropriate meter.

Moreover, a very important feature of the present invention is that the selection of the proper meter also acts to select the correct monochromatic light to be used. This is done by providing a plurality of photoelectric cells and a switch that places only one such cell into the actual circuit at a time. The switch itself is actuated to change filter-cell combinations by installation of such meters as need the change. Thus, there may be a "normally operative" photoelectric cell, which is in the circuit when no meter is in the circuit and which stays in when certain meters without cell-changing actuators are installed. For example, the cholesterol meter may have no switch actuator, so that the switch remains in its "normally operative" position to give red light. However, the hemoglobin and glucose meters may have a switch actuator, so that installation of these meters actuates the switch to remove the red-responsive photocell (which has an associated red filter) from the circuit and place the green-responsive photocell (which has an associated monochromatic green filter) into the circuit. Thus, the apparatus is foolproof; the physician need not wonder later whether he had the proper photocell or the proper filter in operation, for if he is reading the proper meter, the proper photocell is in operation and its light is passing through the proper filter.

Another feature of the invention is the use of a single very low power consumption light source, which is so located that instead of the light traveling directly and diametrically across the cuvette, which contains the sample, it travels at an angle therethrough, thereby giving a longer light path so that sensitivity is increased. Also, this passage of light at an angle through the cuvette and sample has been found to give results that are less affected by flaws in the cuvette walls than when the light passes through diametrically. The angle is not very large but it is sufficient to overcome this difficulty, and tests show that it does improve the uniformity of response. This also enables the use of a single light source for a plurality of photoelectric cells without having to be concerned about the fact that the light is not going diametrically but at an angle. In other words, superior results are obtained by this procedure.

Another problem solved by the invention is that of maintaining the cuvette during the colorimeter test in exactly the correct position, and this is done by an arrangement in which spring means forces the cuvette into the proper location and holds it there.

Adjustments which may be required by irregularities in currents are taken care of by the invention also. In the first place, the current is regulated to provide a very smooth flow of current, and in the second place there is an adjustment means to take care of such changes as occur in the instruments due to ambient temperatures, etc.; very simple adjustment enables the physician to obtain accurate results quite easily.

One problem that can sometimes be annoying to an individual physician who does not have a large laboratory is that some tests require incubation of the sample. In other words, the samples are put into test tubes or cuvettes and then must be brought to a certain temperature and remain there for a specified time. The present invention provides as a part of the complete unit and as part of the same electrical circuit an incubation block in which a plurality of test tubes are uniformly heated. This enables the same heat to be given to a test blank or calibration sample as to the actual sample being tested, and each sample is given the same treatment. The circuit includes heat control means for holding the heat within the desired amount.

Other objects and advantages of the invention will appear from the following description of a preferred embodiment.

In the drawings:

FIG. 1 is a view in perspective of an instrument embodying the principles of the invention.

FIG. 2 is an enlarged view in section taken along the line 2—2 in FIG. 1.

FIG. 3 is a view in section taken along the line 3—3 in FIG. 2.

FIG. 4 is a view in section taken along the line 4—4 in FIG. 3.

FIG. 5 is a rear perspective view of one of the removable meters, this particular one having a switch-actuating means for changing the photocell and light filter used in the instrument.

FIG. 6 is a fragmentary view in section of the incubator, with test cuvettes shown in broken lines.

FIG. 7 is a view taken along the line 7—7 in FIG. 6.

FIG. 8 is a bottom plan view of the instrument, with the case removed.

FIG. 9 is an enlarged fragmentary view in section of the testing well with the light source and photoelectric cells shown.

FIG. 10 is a view taken along the line 10—10 in FIG. 9.

FIG. 11 is a fragmentary view in elevation showing the spring arrangement for retaining the cuvette in proper relationship to the testing well.

FIG. 13 is a view in section taken along the line 13—13 in FIG. 9.

Figure 12:
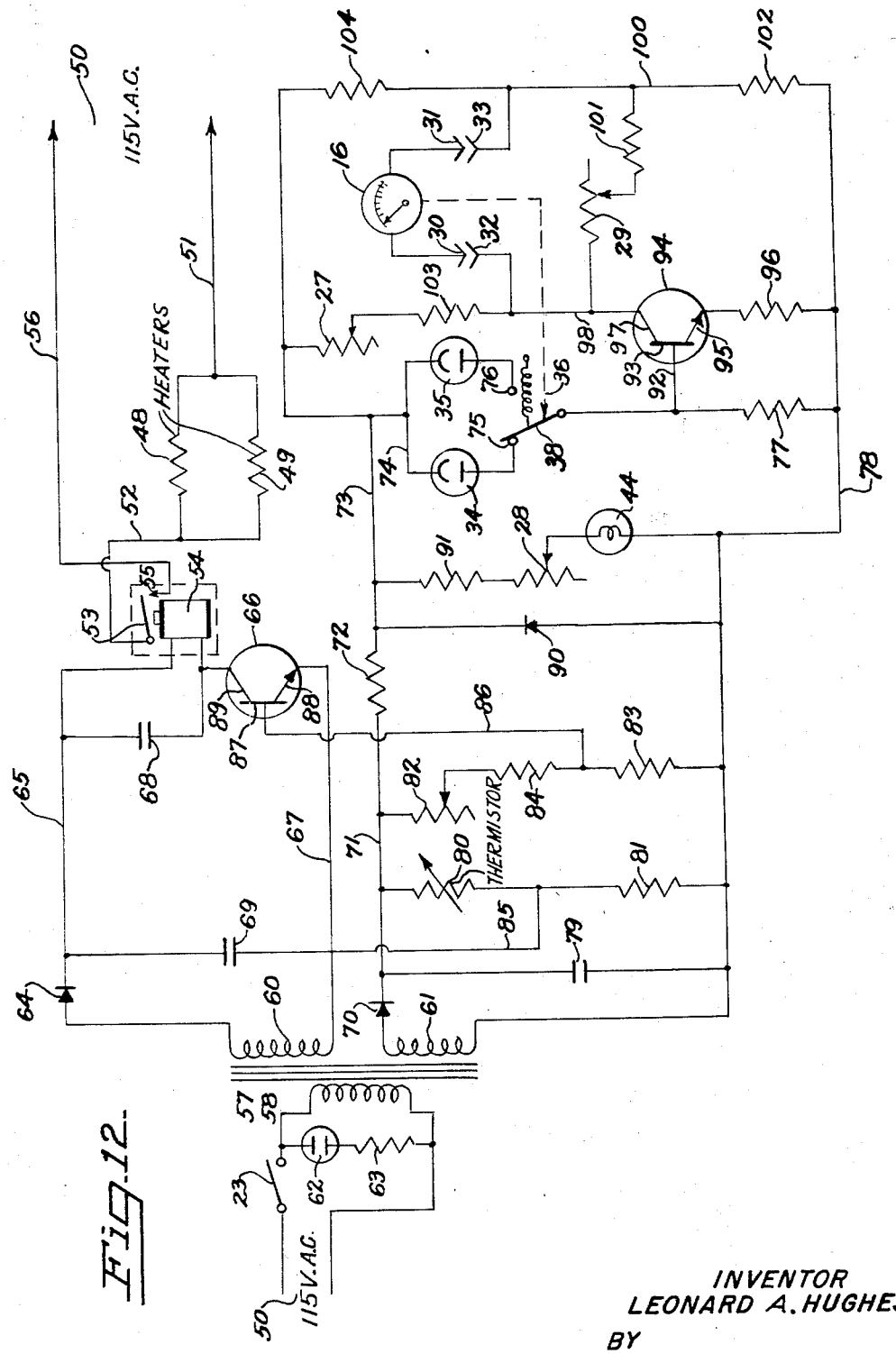
FIG. 12 is an electrical circuit diagram of an instrument embodying the principles of the invention.

As shown in FIG. 1, the colorimeter 10 includes a housing 11 with a top plate 12. An opening 13 in the top plate 12 leads to a cylindrical receptacle 14 (see FIG. 3) in which fits a cylindrical portion 15 of a removable meter 16, of which there are a plurality, used one at a time. The case also provides a keyed entry opening 17 leading to a test well 18 (FIGS. 8–11) in which a keyed cuvette 20 is inserted in proper alignment for the colorimetry tests. The key may comprise a notch 19 at the opening 17 and a projection secured to the cuvette, and means that better control of the cuvette's light transmissivity can be obtained. A series of openings 21 through the top plate 12 lead to a series of incubation wells 22 (FIGS. 6 and 7). Also mounted on the top plate 12 are an on-off switch 23 and adjustment knobs 24, 25, and 26, which respectively control three potentiometers 27, 28, and 29.

A different removable plug-in meter 16, interchangeable with the others, is provided for each type of test, and it reads directly in the appropriate units. For example, the hemoglobin meter reads directly in "hemoglobin percent," and instead of reading from zero to one hundred, runs full scale from zero to twenty, in the range of the percentage in which hemoglobin actually appears in blood, thereby enabling the spreading of the calibration marks. Similarly, meters 16 for cholesterol, blood sugar, and other tests are calibrated for direct reading in a scale selected to cover a practical range.

Each meter 16 is provided with two plugs 30, 31 preferably of the banana type, which enter receptacles 32, 33 to place the meter 16 across a bridge circuit so that it reads a value corresponding to the voltage across one of two (or more) photoelectric cells 34 and 35. In addition, certain meters 16 (but not all of them) have at least one more projection or actuator 36 thereon which, when present, each such actuator 36 may enter an opening 37 and engage a switch 38 to remove one photocell 34 from the circuit and to place another photocell such as the cell 35 in the circuit. Thus, the hemoglobin meter 16 has such an actuator 36, so that green light will be used for the test, in connection with a green-sensitive photocell 35. Actuation of the switch 38 is shown in FIG. 2, where the projection 36 bears down upon the switch 36. More than two cells can be used with the use of the same general idea, having meters keyed to actuate each cell, as appropriate, or else to leave a normally operative cell in the circuit, when that is appropriate.

The test well 18 is in a block 40. The well 18 has an open bottom end 41 of smaller diameter than the rest of the well, on which the cuvette 20 rests during the test, while a spring 42 holds the cuvette firmly against one side 43 of the well, where the photocells are located. The spring 42 has one end 42a secured near the upper end of the well and a diagonal portion 42b extending downwardly outside the well block 40. At its lower end, the spring has a portion 42c extending perpendicular to the portion 42b and extending through an opening 42d that goes across the block 40 and is joined with the well 18. The portion 42c has a tubular plastic cover 42e for for resilient engagement with the lower rounded end of the cuvette 20; when the cuvette 20 is inserted in the well 18 and pushed all the way down in it, it pushes the spring end 42c out and thereafter the spring holds the cuvette 20 tightly against the well wall 43. This means that the same small portion of the cuvette 20 is used for light transmission to all cuvettes, and therefore the cuvette walls need to be prepared only for that portion. A single source of light is used, preferably a lamp 44 with very low power rating, such as a 300 milliwatt light bulb, which gives sufficient light but very little heat. Thus, there is little if any distortion due to the heating effects from the lamp 44 during the taking of the reading, and the effect of such heat upon the photocells 34 and 35 or upon other portions of the circuit are also minimized. One photocell 34 is located above the narrow-diameter opening 44a for the lamp 44 and another photocell 35 is located below the horizontal level of the lamp 44, so that the light passes through the cuvette 20 at an angle. This gives a longer light path and as a result gives greater sensitivity. It has also been found that defects or a foreign matter on the cuvette wall do not affect the uniformity of transmissivity from one such cuvette to another so much when the light path to the cell is at an angle. The angle should lie within the approximately 45° angle at which the light is emitted from the opening 44a, which may be about 1/64" in diameter. One photocell 35 is provided with a monochromatic green filter 45 and the other one 34 is provided with a monochromatic red filter 46, and the photocells 34, 35 are properly matched so that the filter passes the light color to which its cell has a maximum response.

The incubator wells 22 are in a block 47. For example, there may be six wells 22, enabling the incubation of six samples at once so that a blank and control can be used in connection with several actual samples. A pair of heaters 48 and 49 are used to help maintain even distribution of heat over the sample, and a thermistor 80 senses the temperature of the block 47.

For the electrical circuit, a source 50 of 115-volt AC may be used and may be used both for direct connection for the heater unit as well as for the main portion of the circuit. The heaters 48 and 49 are in parallel and are connected by a line 51 to one side of the 115-volt AC, while the other side of the parallel network is connected by a line 52 to a contact 53 of a reed-type relay 54. The contact 55 of the relay 54 is connected by a line 56 to the other side of the 115-volt AC current source 50, so that when the relay reed 55 is closed by energization of the relay 54, the heaters 48, 49 heat, and when the relay reed 53 is open, the heaters 48, 49 do not heat. The same 115-volt AC current, and actually in construction the same plug, is connected through the on-off switch 23 to a transformer 57 having a primary 58 and a pair of secondaries 60 and 61. The primary 48 is in parallel with a signal light 62 that is in series with a resistor 63 which shows when the unit is on or off. The light 62 may actually be below a transparent switch handle for the switch 23, and may shine through it.

The secondary 60 is connected to a rectifier 64 which sends current through a line 65 to the relay 54, while current from the other side of the relay coil returns to the secondary 60 through a transistor 66 to a line 67. This causes amplification of the current going through the relay coil.

A condenser 68 in parallel with the relay coil 54 helps to prevent the chatter of the relay reed 53 by regulating the current so that no sudden current fluctuation will actuate the coil. A condenser 69 connected between the lines 65 and 67 prevents AC ripple.

The secondary 61 is connected through a rectifier 70 by a line 71 to a resistor 72 and thence by a line 73 to a parallel network 74 containing the plurality of photocells, of which two are shown, photocells 34 for red light and 35 for green light. As shown in this diagram, the cell 34 for red light is normally in the circuit by normal closure of the switch 38 resting against a contact 75, whereas the green cell 35 is normally open with its contact 76 normally open. The return from the network 74 goes through the switch 38 and a resistor 77 to a return line 78. AC ripple is again removed by a condenser 79 across the lines 71 and 78.

Regulation of the heating circuit is obtained by a network which includes a thermistor 80 as one leg of a bridge, a standard resistor 81 as a second leg, a variable resistor or potentiometer 82 as a third leg, and another standard resistor 83 as the fourth leg. A fixed resistor 84 may be considered as part of the variable resistor 82. For example, the resistors 81 and 83 may have values of 1,800 ohms each and the thermistor 80 may have a resistance of 1,800 ohms when warm and in balance and a resistance of 3,000 ohms when cold. The temperature is set by setting the potentiometer 82, when in balance, to 1,800 ohms, so that all four will be the same. Slight variations can be used to adjust the temperature and this will affect the operation. The line 67 is connected to a point between the thermistor 80 and the resistor 81 by a line 85, whereas a line 86 connects the base 87 of the transistor 66 to a point between the resistor 83 and the resistor-potentiometer combination 84, 82. The transistor 66 has its emitter 88 connected to the line 67, and its collector 89 connected to the relay 54. When everything is in balance, or when the balance is exceeded, the heat will be off because the coil 54 will be opened due to the fact that no current will be flowing through it because of the balanace on the transistor 66. When the unit is cold and yet turned on, that is when it is below the temperature for which it is set, then current will flow through the transistor 66 and there will be heating.

Beyond this heating control part and beyond the resistor 72, I preferably provide a voltage regulator diode 90, across the lines 73 and 78 to provide for accurate regulation of a low-value voltage, preferably about 7 volts. This low voltage helps the stability of the unit and avoids undue heat. The lamp 44 is across the lines 73 and 78 in series with a resistor 91 and the potentiometer 28. This enables adjustment of the brightness of the lamp 44. This adjustment is usually made at the factory and may be left that way; however, as the lamp 44 ages, it may get brighter or dimmer, and if a time is reached when the initial adjustments of either of the potentiometers 27 and 29 can no longer effect proper balance, the knurled shaft 25 may be used to adjust the potentiometer 28 and thereby change the brightness of the lamp 44. The lamp 44 is preferably soldered in place at the factory and replaced by a factory representative so that there is no problem about removal of the light or its being in the wrong position to give the proper illumination.

The current flowing through the photocell network 74 is tapped by a line 92 to go to the base 93 of a transistor 94 whose emitter 95 is connected through a resistor 96 to the line 78, while the collector 97 of the transistor 94 is connected to a line 98. The resistor 77 provides bias stabilization for the transistor 94, and the resistor 96 provides a degenerative feedback to improve the linearity and to give temperature stabilization by decreasing somewhat the sensitivity of the device. The line 98 is connected to a line 100 through the potentiometer 29 and a resistor 101 each of which are legs of the meter bridge. The potentiometer 29 is used to adjust the sensitivity of the meter 16. The line 100 in turn is connected to the line 78 through a resistor 102. The line 98 is also connected through a resistor 103 and the potentiometer 27 to the line 73. The resistor 103 may be considered to be a part of the potentiometer 27, which is used to provide meter balance. The line 100 is connected to the line 73 by a resistor 104. The meter 16 itself is connected across the lines 98 and 100 through the banana plugs 30, 31 and sockets 32, 33. Being in a bridge circuit, the scale of the meter can be adjusted by the potentiometer 29, thereby enabling use of the full scale of each meter.

In operation, the physician, after taking his sample and adding the proper reagent, or heating it, if desired, in the incubator for a period, makes sure that he has the correct meter 16 corresponding to the test that he wants. By installing this meter 16, he automatically assures that he will have the correct photocell 34 or 35 with the correct filter 46 or 45 for that photocell, all in operation. Then with the unit turned on, he first puts a cuvette 20 containing a standard value into the well 18. The meter 16 is then set to the value of the standard by using the knob 24 to vary the potentiometer 27. This means that at this point there is no current passing through the meter 16; it is in balance. Next, another cuvette with a blank is inserted and the potentiometer 27 is varied to obtain the zero setting of the meter 16. Then the cuvette containing the actual sample may be inserted and a direct reading from the meter 16 is obtained in the units desired.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A colorimeter, including in combination:
a receptacle for receiving a colorimeter cuvette containing a specimen, said receptacle having a light source and a plurality of photoelectric cells diametrically opposite said light source and vertically displaced from each other, each cell having its maximum sensitivity to a different color of light,
separate filter means for each said cell between said cell and said light source for transmitting to its said cell only monochromatic light of the type to which its said cell has maximum sensitivity,
an electric circuit including said photoelectric cells, switch means for placing only one of said cells in the electric circuit at any one time, said switch means normally placing a particular cell in said electric circuit, and a bridge circuit responsive to the current of the cell then in the circuit,
means for detachably mounting and connecting into said electric circuit any one of a plurality of interchangeable meters, each relevant to and reading directly in terms of one particular type of test requiring a particular said cell in said electric circuit for measuring the light transmissivity of said specimen as expressed by the current passing through the said photoelectric cell then in said electric circuit, and
means in said means for detachably mounting actuated by an actuator on selected ones of said meters for throwing said switch means to place a different said cell in said electric circuit from that normally placed in said electric circuit.

2. The colorimeter of claim 1 wherein said receptacle has a tubular opening oversize for the cuvettes used, there being a small opening adjacent to and connected with said tubular opening on the side thereof, and spring means in said small opening for bearing against the side of a cuvette inserted into said tubular opening, for holding said cuvette firmly against the wall of said tubular opening diametrically opposite from said small opening.

3. The colorimeter of claim 1 having adjacent said receptacle an incubator for culturing a sample in a said cuvette, said incubator having a plurality of cuvette receptacles and heating means for said incubator comprising part of said electric circuit in parallel with said switch and with said bridge circuit.

4. A colorimeter, including in combination:
a receptacle for receiving a colorimeter cuvette containing a specimen, said receptacle having a lamp opening and a plurality of cell openings therethrough diametrically opposite said lamp opening and vertically displaced from each other and body means providing an enclosed passage for each said opening,
a small electric lamp bulb in the passage of said lamp opening,
a photoelectric cell in each passage of said cell opening, each cell having maximum sensitivity to a different monochromatic light,
filter means in each said cell opening for transmitting to the cell monochromatic light of the type to which its said cell has maximum sensitivity,
an electric circuit including switch means for placing each one of said photoelectric cells in the electric circuit but only one of them at any one time, one particular said cell normally being in said electric circuit, and a bridge circuit responsive to the current of the cell in the electric circuit at said one time,
means for detachably mounting and connecting into said electric circuit any one of a plurality of interchangeable meters, each relevant to and calibrated to read directly in terms of a particular type of test when used in conjunction with a particular cell in said electric circuit for measuring light transmissivity of said specimen as expressed by the current passing thorugh the said photoelectric cell then in said electric circuit, and
means in said means for detachably mounting actuated by an actuator on selected ones of said meters for throwing said switch means to place a different said cell in said electric circuit from that normally placed in said electric circuit.

5. A colorimeter, including in combination:
a receptacle for receiving a colorimeter cuvette containing a specimen, said receptacle having an electric lamp as a light source and a plurality of photoelectric cells diametrically opposite said electric lamp vertically displaced from each other, each cell having maximum sensitivity to a different monochromatic light, and filter means adjacent each said cell between said cell and said lamp for transmitting to the cell monochromatic light of the type to which its said cell has maximum sensitivity,
an electric circuit including said electric lamp, switch means for placing each of said cells in the electric circuit, only one at any one time, one given cell being normally placed in said electric circuit, a bridge circuit responsive to the current of the cell in the electric circuit at said one time, said electric circuit also having a source of energy for lighting said lamp, and an electrical heater,
an incubator located on said colorimeter adjacent said receptacle and having a plurality of cuvette receptacles heated by said heater,
means for detachably mounting and connecting into said electric circuit any one of a plurality of interchangeable meters, each relevant to and reading in terms of a particular type of test requiring a particular said cell in said electric circuit for measuring light transmissivity of said specimen as expressed by the current passing through the said photoelectric cell then in said electric circuit, and
means in said means for detachably mounting actuated by an actuator on selected ones of said meters for throwing said switch means to place a different said cell in said electric circuit from that normally placed in said electric circuit.

6. The colorimeter of claim 5 having voltage regulator means for controlling the voltages applied to said heater and to both said photoelectric cell and said lamp.

7. The colorimeter of claim 5 having
a first potentiometer in said circuit for varying the regulated voltage applied to said lamp,
second potentiometer means in said bridge circuit for varying the maximum reading of said meter, and a third potentiometer in said bridge circuit for adjusting the zero reading of said meter.

References Cited
UNITED STATES PATENTS

| | | |
|---|---|---|
| 3,286,583 | 11/1966 | Ferrari. |
| 2,157,438 | 5/1939 | Sparks. |
| 2,245,124 | 6/1941 | Bonn. |
| 2,384,350 | 9/1945 | Skulley _____ 324—115 X |
| 2,424,858 | 7/1947 | Senn. |
| 2,483,875 | 10/1949 | Boyer. |
| 2,836,793 | 5/1958 | Kelly _____ 324—149 X |
| 2,970,267 | 1/1961 | Pfeffer _____ 324—149 X |
| 3,271,112 | 9/1966 | Williams et al. |
| 3,306,156 | 2/1967 | Glasser et al. |

OTHER REFERENCES

Shurkus: "Colorimetry," Radio News, June 1944, pp. 25–27, 56, 58, 60, 71.

JEWELL H. PEDERSON, *Primary Examiner.*

W. A. SKLAR, *Assistant Examiner.*

U.S. Cl. X.R.

324—115, 149; 356—39